(12) United States Patent
Tsai et al.

(10) Patent No.: US 9,625,998 B2
(45) Date of Patent: Apr. 18, 2017

(54) INTERACTION METHOD BETWEEN WEARABLE DEVICES AND WEARABLE DEVICE THEREOF

(71) Applicant: INVENTEC APPLIANCES CORP., New Taipei (TW)

(72) Inventors: Tony Tsai, Shanghai (CN); Xu-Dong Chen, Shanghai (CN)

(73) Assignee: INVENTEC APPLIANCES CORPORATION, New Taipei (TW)

( * ) Notice: Subject to any disclaimer, the term of this patent is extended or adjusted under 35 U.S.C. 154(b) by 349 days.

(21) Appl. No.: 14/328,548

(22) Filed: Jul. 10, 2014

(65) Prior Publication Data

US 2015/0149924 A1    May 28, 2015

(30) Foreign Application Priority Data

Nov. 22, 2013    (CN) .......................... 2013 1 0596422

(51) Int. Cl.
*H04L 29/06* (2006.01)
*G06F 3/01* (2006.01)
*H04W 4/00* (2009.01)
*G06F 1/16* (2006.01)
*H04L 29/08* (2006.01)

(52) U.S. Cl.
CPC .............. *G06F 3/017* (2013.01); *G06F 1/163* (2013.01); *H04L 67/12* (2013.01); *H04L 67/141* (2013.01)

(58) Field of Classification Search
None
See application file for complete search history.

(56) References Cited

U.S. PATENT DOCUMENTS

| | | | | |
|---|---|---|---|---|
| 6,757,719 B1 * | 6/2004 | Lightman | ............ | G06Q 20/383 455/419 |
| 6,915,429 B1 * | 7/2005 | Allen | .................. | H04L 63/0823 713/170 |
| 8,638,190 B1 * | 1/2014 | Want | ....................... | G06F 3/017 715/863 |
| 2009/0031258 A1 * | 1/2009 | Arrasvuori | .............. | G06F 3/017 715/863 |
| 2011/0066984 A1 * | 3/2011 | Li | ....................... | G06F 3/04883 715/863 |

* cited by examiner

*Primary Examiner* — Jeffrey A Gaffin
*Assistant Examiner* — Nhat-Huy T Nguyen
(74) *Attorney, Agent, or Firm* — Foster Pepper PLLC

(57) ABSTRACT

An interaction method between wearable devices comprises: sending a detection signal from a first wearable device to detect a second wearable device according to a predetermined interaction rule used by the first wearable device and the second wearable device; sending a response signal to confirm the interaction from the second wearable device to the first wearable device according to the predetermined interaction rule after the second wearable device receives the detection signal; establishing an interaction communication between the first wearable device and the second wearable device after the first wearable device receives the response signal, interacting between the first wearable device and the second wearable device according to the predetermined interaction rule. The method of the present invention enhances the intelligence and social function of the wearable devices.

6 Claims, 9 Drawing Sheets

INTERACTION METHOD BETWEEN WEARABLE DEVICES AND WEARABLE DEVICE THEREOF

PRIORITY CLAIM

This application claims the benefit of the filing date of Chinese Patent Application No. 201310596422.5, filed Nov. 22, 2013, entitled "INTERACTION METHOD BETWEEN WEARABLE DEVICES AND WEARABLE DEVICE THEREOF," and the contents of which are hereby incorporated by reference in their entirety.

FIELD OF THE INVENTION

The invention relates to the field of electronic communications technology, more particularly, to interaction method between wearable devices and wearable device thereof.

BACKGROUND

Wearable devices are novel concepts, technologies and applications. The basic principal of wearable devices is integrating various sensors, wireless transmission technologies and other existing equipment to minimize the size and improve the practicality of wearable devices to be worn on a user's body. A typical example of a wearable device is Google glass or Samsung's Galaxy Gear Watch.

Wearable devices of the prior art are developed with focus on the features of the device itself and auxiliary equipment applications, but interactive wearable devices are rarely focused on. There is no interaction method between wearable devices of the prior art.

SUMMARY OF THE INVENTION

The present invention is generally directed to an interaction method between wearable devices.

In one aspect of the present invention, an interaction method between wearable devices includes the steps of (1) sending a detection signal from a first wearable device to detect a second wearable device according to a predetermined interaction rule for use by the first wearable device and the second wearable device; (2) upon the second wearable device receiving the detection signal, the first wearable device receiving a response signal agreeing to interaction, transmitted from the second wearable device according to the predetermined interaction rule; (3) upon the first wearable device receiving the response signal, establishing an interactive communication between the first wearable device and the second wearable device; and (4) the first wearable device interacting with the second wearable device according to the predetermined interaction rule by the interactive communication.

In another aspect of the present invention, a wearable device includes a detection unit used for sending a detection signal to detect a second wearable device according to a predetermined interaction rule for use by the wearable device and the second wearable device; a receiving unit used for receiving a response signal sent from the second wearable device; an interactive communication unit used for establishing an interactive communication with the second wearable device; and an interacting unit used for interacting with the second wearable device according to the predetermined interaction rule by the interactive communication.

In yet another aspect of the present invention, a wearable device includes a receiving unit used for receiving a detection signal sent from a first wearable device according to a predetermined interaction rule for use by the first wearable device and the wearable device; a sending unit used for sending a response signal agreeing to interaction with the first wearable device; an interactive communication unit used for establishing an interactive communication with the first wearable device; and an interacting unit used for interacting with the first wearable device according to the predetermined interaction rule by the interactive communication.

Many other advantages and features of the present invention will be further understood by the following detailed description and the appended drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
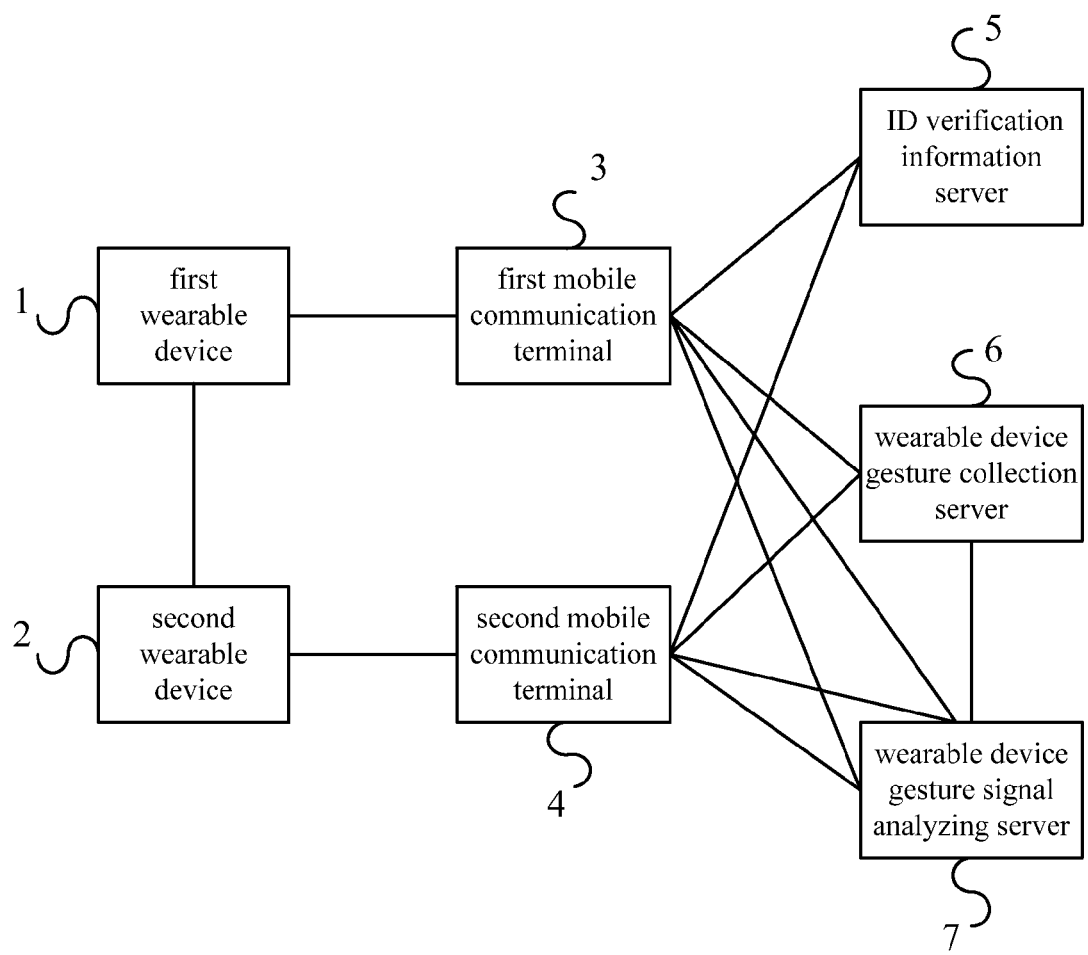
FIG. 1 shows the interaction system between the wearable devices in an embodiment of the invention.

Please refer to FIG. 1. FIG. 1 illustrates the interaction system between the wearable devices in an embodiment of the invention. The interaction system is used to make the wearable devices interact between each other and comprises a first wearable device 1 and a second wearable device 2. The interaction system further comprises a first mobile communication terminal 3 to communicate with the first wearable device 1, and a second mobile communication terminal 4 to communicate with the second wearable device 2. Additionally, the interaction system can further comprise an ID verification information server 5, a wearable device gesture collection server 6, and a wearable device gesture signal analyzing server 7 to communicate with the mobile communication terminal or the wearable device.

The ID verification information server 5 is used to receive a request for the ID verification information of the first wearable device 1, from the second wearable device 2; if it is determined that the second wearable device 2 is a verified or permitted device and the ID verification information of the first wearable device 1 is allowed to be disclosed, the ID verification information server 5 searches for the ID verification information of the first wearable device 1 in order to perform the step of sending the ID verification information of the first wearable device 1 to the second wearable device 2.

The wearable device gesture collection server 6 is used to receive a request that explains each said gesture signal from the wearable device. The wearable device gesture collection server 6 then searches for a gesture signal that corresponds to each said gesture signal and sends the corresponding gesture signal to a wearable device gesture signal analyzing server 7.

The wearable device gesture signal analyzing server 7 is used to analyze the corresponding gesture signal in order to obtain the meaning that corresponds to each said gesture signal and sends the obtained meaning to the wearable device.

The gesture signal is a gesture performed by the user wearing the wearable device.

It is worth noting that the ID verification information server 5, the wearable device gesture collection server 6, and the wearable device gesture signal analyzing server 7 are only a few types of cloud server technology comprised in the interaction system of the present invention. The types of servers comprised in the interaction system of the present invention are not limited to the server mentioned above. In practice, the interaction system of the present invention can further comprise a user credit server, to collect and compile evaluation information, credit information and ability information of the user. Additionally, the interaction system can further comprise an LBS server, to push every type of server around the location server.

Figure 2:
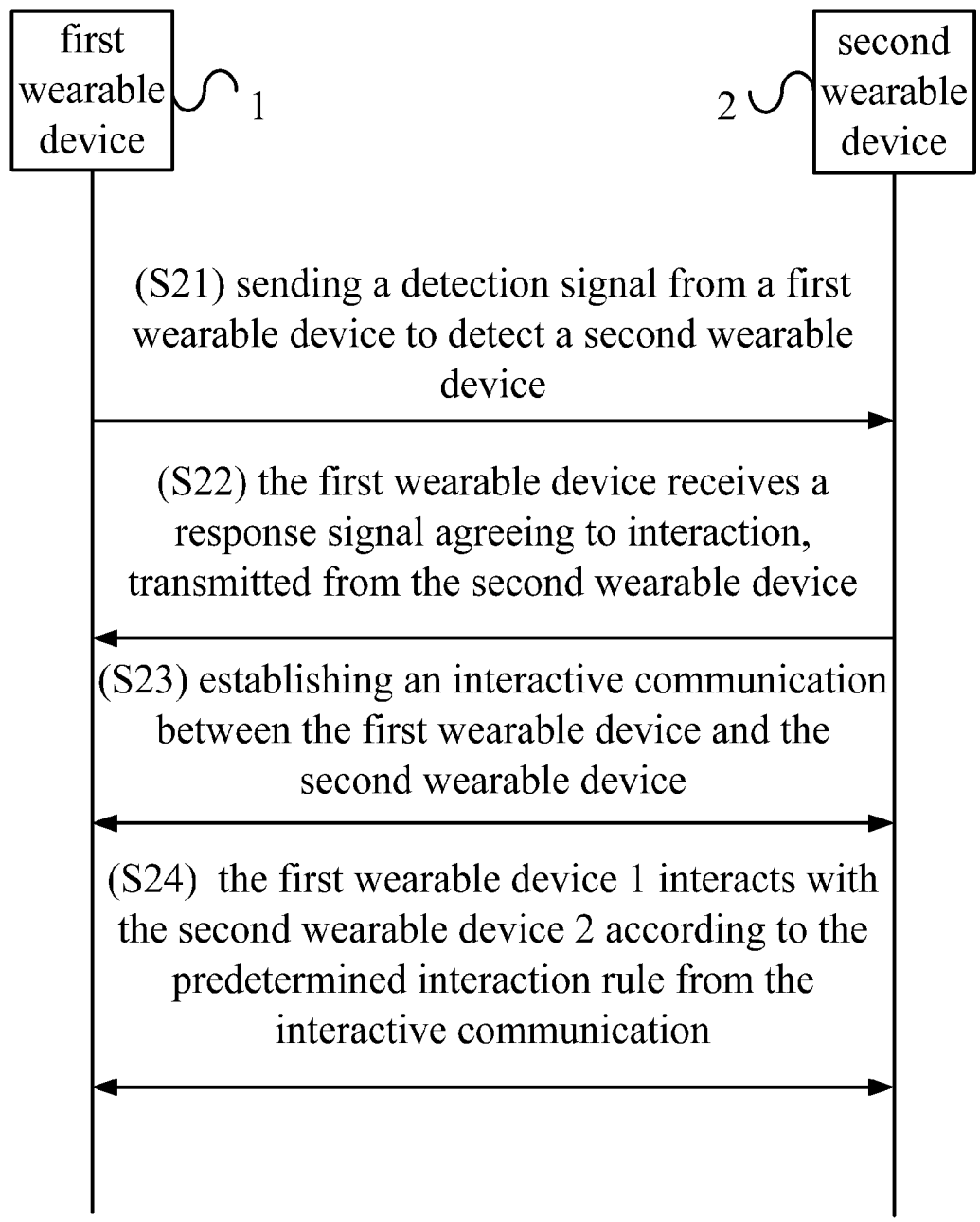
FIG. 2 is a flow chart of the interaction method between the wearable devices in the first embodiment of the invention.

Please refer to FIG. 2. FIG. 2 is a flow chart of the interacting method between the wearable devices in the first embodiment of the invention, comprising the following steps of:

(S21) sending a detection signal from a first wearable device 1 to detect a second wearable device 2 according to a predetermined interaction rule used by the first wearable device 1 and the second wearable device 2. In practice, the first wearable device 1 can send a detection signal to detect a second wearable device 2 according to a predetermined interaction rule through a BLE or NFC wireless transmission device. The detection signal sent from the first device 1 can be of lighting, graphic pattern or vibration.

In this embodiment, the use of the predetermined interaction rule is to define the interaction rule between the wearable devices. The use of the predetermined interaction rule is to define the meaning of a gesture signal and the meaning of the gesture signal defined by the predetermined interaction rule are listed in TAB. 1. The gesture signal can be generated by gestures from the user.

TABLE 1 meaning of the gesture signal

| No. | Gesture signal | Meaning |
|---|---|---|
| 1 | Pushing from inside to outside with palms facing outside. | Rejection, No |
| 2 | Waving repeatedly left and right with palms facing outside. | Waving to express a greeting or to say goodbye, "Hello" (slowly and slightly), or "Goodbye" (quickly and strongly) |
| 3 | Turning wrist clockwise or counterclockwise with palm facing outside. | Happily express the greeting, "Hi, I'm here!" |
| 4 | Shaking wrist left and right with palm facing outside. | Happily express the greeting, "Hi, I'm here!" |
| 5 | Waving fist up to down with the hole of fist facing up. | Beat slightly. |
| 6 | Moving fist quickly and repeatedly up to down with the back of fist facing up. | Threaten to fight. |
| 7 | Moving inside to outside quickly with palm facing inside. | Come here. |
| 8 | Beating quickly but slightly with palm facing outside. | Consolation, tap |
| 9 | Beating quickly and strongly with palm facing outside. | Warning, hit you |
| 10 | Shaking quickly but slightly with palm facing down. | Ok, yes, agree, it's a deal; imitate nodding |
| 11 | Reverse palm repeatedly with the palm standing | Imitate shaking head, no |
| 12 | Waving out quickly from inside to outside with palm facing inside. | Annoyed, Get out |
| 13 | Moving palm or fist up and down slightly. | Praise, ok |
| 14 | Rolling the wrist up to down | Despise |
| 15 | Moving the fist up to down slightly, slowly and repeatedly with the back of the fist facing down, like knocking on a door. | Very carefully, greeting politely, "may I communicate with you?" |

(S22) upon the second wearable device 2 receiving the detection signal, the first wearable device 1 receives a response signal agreeing to interaction, transmitted from the second wearable device 2 according to the predetermined interaction rule.

Upon the second wearable device 2 receiving the detection signal sent from the first wearable device 1, the second wearable device 2 can send the response signal agreeing to interact with the first wearable device 1 in the same way as the first wearable device 1 sending the detection signal to the second wearable device 2. Similarly, the form of the response signal can be of lighting, graphic pattern or vibration. The second wearable device 2 can also respond automatically to the first wearable device 1 and send the response signal agreeing to interaction with the first wearable device 1.

(S23) upon the first wearable device 1 receiving the response signal, establishing an interactive communication between the first wearable device 1 and the second wearable device 2.

(S24) the first wearable device 1 interacts with the second wearable device 2 according to the predetermined interaction rule from the interactive communication.

According to the statement mentioned above, the predetermined interaction rule is used to define the interaction rule between the wearable devices. The present invention comprises many kinds of interaction rules. For example, the interaction rule can be the same as the mobile phones message business rules. The use of the interaction rule can also define the meaning of a gesture signal, wherein the gesture signal can be generated by the gesture from the user.

Because the wearable device can be worn by the user conveniently, the wearable device can also easily sense the movement of the user. The use of the predetermined interaction rule is to define the meaning of a gesture signal, and then upon the wearable device sensing the gesture signal from the user, the wearable device can identify and explain the meaning of the gesture signal to then make a corresponding response.

In practice, the first wearable device 1 interacts with the second wearable device 2 according to the predetermined interaction rule comprising communication langue, lighting, graphic pattern or vibration.

Figure 3:
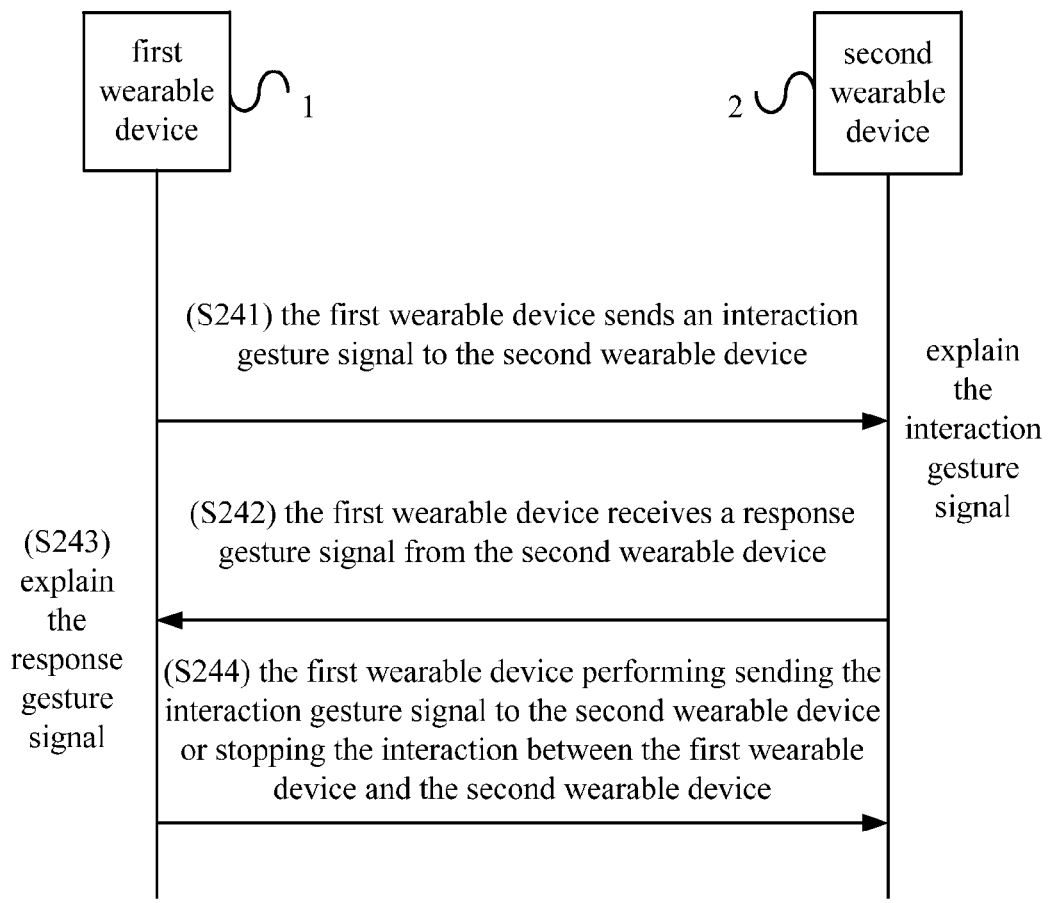
FIG. 3 is a flow chart of the interaction between the wearable devices through the gesture signal in an embodiment of the invention.

When the use of the predetermined interaction rule is to define the meaning of a gesture signal, please refer to FIG. 3. FIG. 3 is a flow chart of the interaction between the wearable devices through the gesture signal in an embodiment of the invention.

(S241) the first wearable device 1 sends an interaction gesture signal to the second wearable device 2.

It is worth noting that the first wearable device 1 sends an interaction gesture signal to the second wearable device 2 in order for the second wearable device 2 to identify and explain the interaction gesture signal according to the predetermined interaction rule.

(S242) upon the second wearable device 2 receiving the interaction gesture signal sent from the first wearable device 1, when the second wearable device 2 is able to identify the interaction gesture signal, explaining the interaction gesture signal according to the predetermined interaction rule. The first wearable device 1 then receives a response gesture signal from the second wearable device 2.

(S243) upon the first wearable device 1 receiving the interaction gesture signal, when the first wearable device 1 is able to identify the response gesture signal, explaining the response gesture signal according to the predetermined interaction rule.

For making the interaction through the gesture signal mentioned above more specific, the following example will be given:

According to the predetermined interaction rule, when the gesture signal is "Move the first up to down slightly, slowly and repeatedly with the back of the first facing down, like knocking on a door", the meaning of the gesture signal is "Very carefully, greeting politely, "may I communicate with you?"". When the gesture is "Shaking quickly but slightly with palm facing down", the meaning is "ok, yes".

After the first wearable device 1 sends the interaction gesture signal, the second wearable device 2 receives the interaction gesture signal. Upon the second wearable device 2 identifying the interaction gesture signal, explaining the interaction gesture signal according to the predetermined interaction rule and then sending the response gesture signal: shaking quickly but slightly with palm facing down, which means the second wearable device 2 allows the interaction with the first wearable device 1.

(S244) the first wearable device 1 sending the interaction gesture signal to the second wearable device 2 or stopping the interaction between the first wearable device 1 and the second wearable device 2 according to the meaning of the response gesture signal.

When the second wearable device 2 sends a response signal agreeing to the interaction, the step of sending an interaction gesture signal from the first wearable device 1 to the second wearable device 2 is performed continuously; when the second wearable device 2 sends a response signal rejecting the interaction, the interaction between the first wearable device 1 and the second wearable device 2 is stopped.

The interaction method between the wearable devices mentioned above in this embodiment can be achieved through two wearable devices which use the same predetermined interaction rule. The interaction is a basic interaction and the interaction method between the wearable devices in this embodiment can perform higher level interaction thorough cloud server technology. For example, when the wearable device cannot identify the receiving gesture signal, a wearable device gesture collection server or a gesture signal analyzing server will receive a request to explain each said gesture signal and obtain the corresponding meaning to said each gesture signal from the wearable device through the cloud server technology.

In practice, when the second wearable device 2 cannot identify the interaction gesture signal, a wearable device gesture collection server or a gesture signal analyzing server will receive a request to explain the said interaction gesture signal and obtain the meaning corresponding to the said interaction gesture signal from the second wearable device 2 through the cloud server technology. When the first wearable device 1 cannot identify the interaction response gesture signal, a wearable device gesture collection server or a gesture signal analyzing server will receive a request to explain the said interaction response gesture signal and obtain the meaning corresponding to the said interaction response gesture signal from the first wearable device 1 through the cloud server technology. In brief, a wearable device gesture collection server or a gesture signal analyzing server can receive a request to explain each said gesture signal and obtain the meaning corresponding of each said gesture signal from the wearable device.

The step of the wearable device gesture collection server or the gesture signal analyzing server receiving the request to explain the said interaction response gesture signal and obtain the meaning corresponding to the said interaction response gesture signal from the wearable device, comprising the following steps of: (A) a wearable device gesture collection server receiving a request to explain each said gesture signal from the wearable device. (B) the wearable device gesture collection server searching for a gesture signal corresponding to each said gesture signal and sending the corresponding gesture signal to a wearable device gesture signal analyzing server. (C) the wearable device gesture signal analyzing server analyzing the corresponding gesture signal to obtain the meaning corresponding to each said gesture signal, and sending the obtained meaning to the wearable device.

When the request is sent from the second wearable device 2, the said gesture signal is an interaction gesture signal. When the request is sent from the first wearable device 1, the said gesture signal is a response gesture signal.

It is worth noting that the predetermined interaction rule used by the wearable device is stored in a built-in interaction rule database. To enrich the gesture signal and the meaning of the gesture signal which is comprised in the predetermined interaction rule of the wearable device, the gesture signal and the meaning of the gesture signal obtained through the cloud data server technology can be further stored in the built-in interaction rule database of the wearable device.

The embodiment of the interaction method mentioned above can allow the interaction between two wearable devices to exist, for example, in greeting each other. But in the interaction, the second wearable device 2 cannot determine whether the first wearable device 1 is a verified or permitted device and the second wearable device 2 also cannot determine whether the first wearable device 1 can meet the interaction condition of the second wearable device 2. Therefore, the second wearable device 2 can interact with the first wearable device 1 passively but the second wearable device does not have the power to make the decision. To enhance the activity of the second wearable device 2 when interacting, the second wearable device 2 in the embodiment can further obtain the ID verification information of the first wearable device 1 through the cloud server technology. Please refer to the second embodiment.

Figure 4:
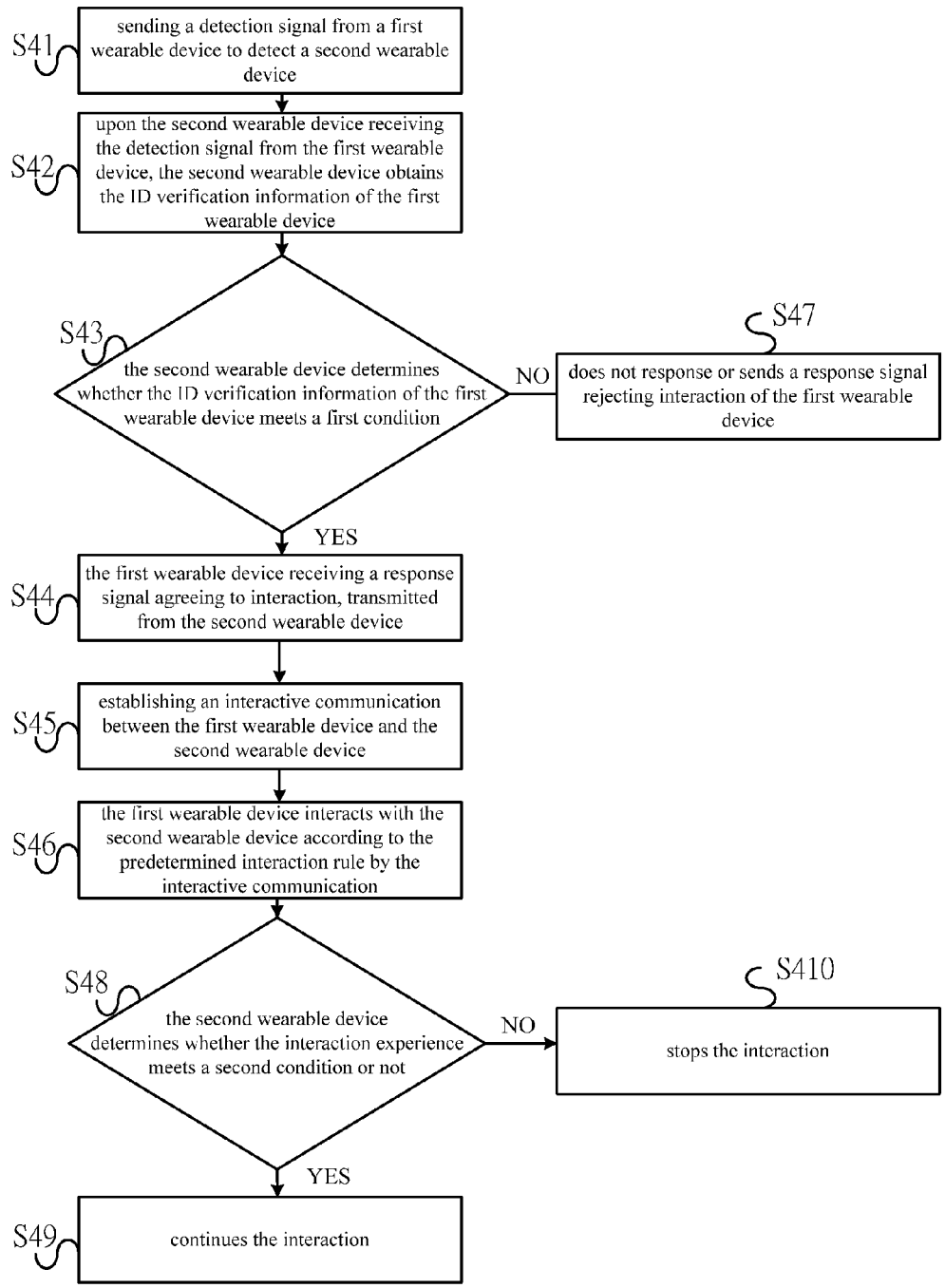
FIG. 4 is a flow chart of the interaction method between the wearable devices in the second embodiment of the invention.

Please refer to FIG. 4. FIG. 4 is a flow chart of the interaction method between the wearable devices in the second embodiment of the invention. The interaction method comprises the following steps of:

(S41) sending a detection signal from a first wearable device 1 to detect a second wearable device 2: the step is the same as the step (S21) in the first embodiment, so this embodiment will not restate the details.

Figure 5:
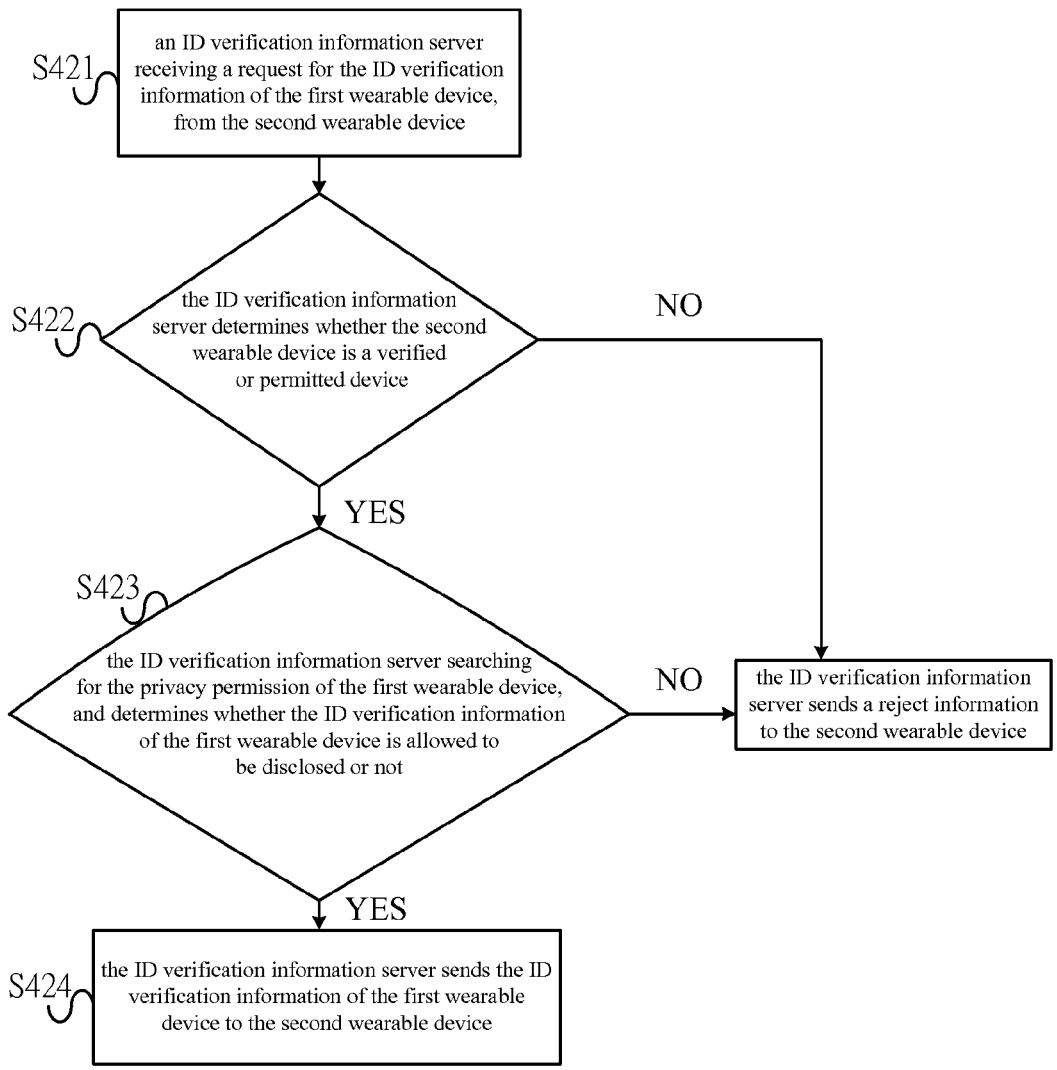
FIG. 5 is a flow chart of the second wearable device capturing the ID verification information of the first wearable device in an embodiment of the invention.

(S42) upon the second wearable device 2 receiving the detection signal from the first wearable device 1, the second wearable device 2 obtains the ID verification information of the first wearable device 1:

Upon the second wearable device 2 receiving the detection signal from the first wearable device 1, the second wearable device 2 obtains the ID verification information of the first wearable device 1. More specifically, please refer to FIG. 5. FIG. 5 is a flow chart of the second wearable device capturing the ID verification information of the first wearable device in an embodiment of the invention, comprising the following steps of:

(S421) an ID verification information server receiving a request for the ID verification information of the first wearable device, from the second wearable device:

It is worth nothing that the ID verification information stored in the ID verification information server comprises registration information/or credit information of the user, wherein the registration information comprises name, gender, hobby, and way of contacting, and the credit information comprises evaluation information, credit information and ability information of the user. The ID verification information stored in the ID verification information server is not limited to the information mentioned above, as the information mentioned above is just an example.

(S422) the ID verification information server determines whether the second wearable device 2 is a verified or permitted device. If the second wearable device 2 is a verified or permitted device, step (S423) is performed. If the second wearable device 2 is not a verified or permitted device, a reject information is sent to the second wearable device 2.

(S423) the ID verification information server searching for the privacy permission of the first wearable device 1, and determining whether the ID verification information of the first wearable device 1 is allowed to be disclosed or not. If the ID verification information of the first wearable device 1 is allowed to be disclosed, step (S424) is performed. If the ID verification information of the first wearable device 1 is not allowed to be disclosed, the ID verification information server sends a reject information to the second wearable device 2.

(S424) the ID verification information server sends the ID verification information of the first wearable device 1 to the second wearable device 2.

(S43) the second wearable device 2 determines whether the ID verification information of the first wearable device 1 meets a first condition:

The second wearable device 2 determines whether the ID verification information of the first wearable device 1 meets a first condition. If the second wearable device 2 determines the ID verification information of the first wearable device 1 meets a first condition, step (S44) is performed; if the second wearable device 2 determines the ID verification information of the first wearable device 1 does not meet a first condition, step (S47) is performed.

It is worth noting that the first condition is a condition predetermined by the second wearable device 2. For example, if the hobby of the user is interacting with music, and when the hobby comprised in the ID verification information of the first wearable 1 is not music, then the first condition is not met.

(S44) the first wearable device 1 receiving a response signal agreeing to interaction, transmitted from the second wearable device 2.

Step (S45) to step (S46) are same as step (S23) to (S24) in the first embodiment. Therefore, the details will not be restated here. For details, please refer to the statements mentioned in the first embodiment.

(S47) does not response or sends a response signal rejecting interaction of the first wearable device 1.

Upon establishing an interactive communication between the first wearable device 1 and the second wearable device 2, the interaction method between the wearable devices of the present invention in this embodiment further comprises: the second wearable device 2 being able to determine whether it is continuously interacting with the first wearable device 1 or not according to the interaction experience. More specifically, the interaction method after step (S45) and step (S46) further comprises:

(S48) the second wearable device 2 determining whether the interaction experience meets a second condition or not:

Upon the first wearable device 1 interacting with the second wearable device 2, the second wearable device 2 will generate the interaction experience. The second wearable device 2 determines whether the interaction experience meets a second condition or not. If the second wearable device 2 determines the interaction experience meets a second condition, step (S49) is performed. If the second wearable device 2 determines the interaction experience does not meet a second condition, step (S410) is performed.

(S49) continues the interaction.

(S410) stops the interaction.

Before establishing an interactive communication in the second embodiment of the wearable interaction method, the second wearable device 2 receives the ID verification information of the first wearable device 1 and determines whether or not to establish an interactive communication with the first wearable device 1 according to the ID verification information of the first wearable device 1. In the interaction method, the activity of the second wearable device 2 is embodied. The second wearable device 2 does not totally obey the request from the first wearable device 1, which allows the interaction to be more flexible and intelligent.

In the interaction method of the first embodiment or the second embodiment, upon establishing the interactive communication between the first wearable device 1 and the second wearable device 2, the first wearable device 1 can further obtain the ID information of the second wearable device 2, and then determine whether or not to continuously interact with the second wearable device 2 according to the ID information of the second wearable device 2. More specifically, please refer to the third embodiment.

The third embodiment is an improvement based on the first embodiment. It is worth noting that the present invention mentioned above can also be improved based on the second embodiment. Through the statement mentioned in the third embodiment, a person who has the knowledge in the field of the present invention can make improvements based on the second embodiment easily while retaining the teachings of the present invention.

Figure 6:
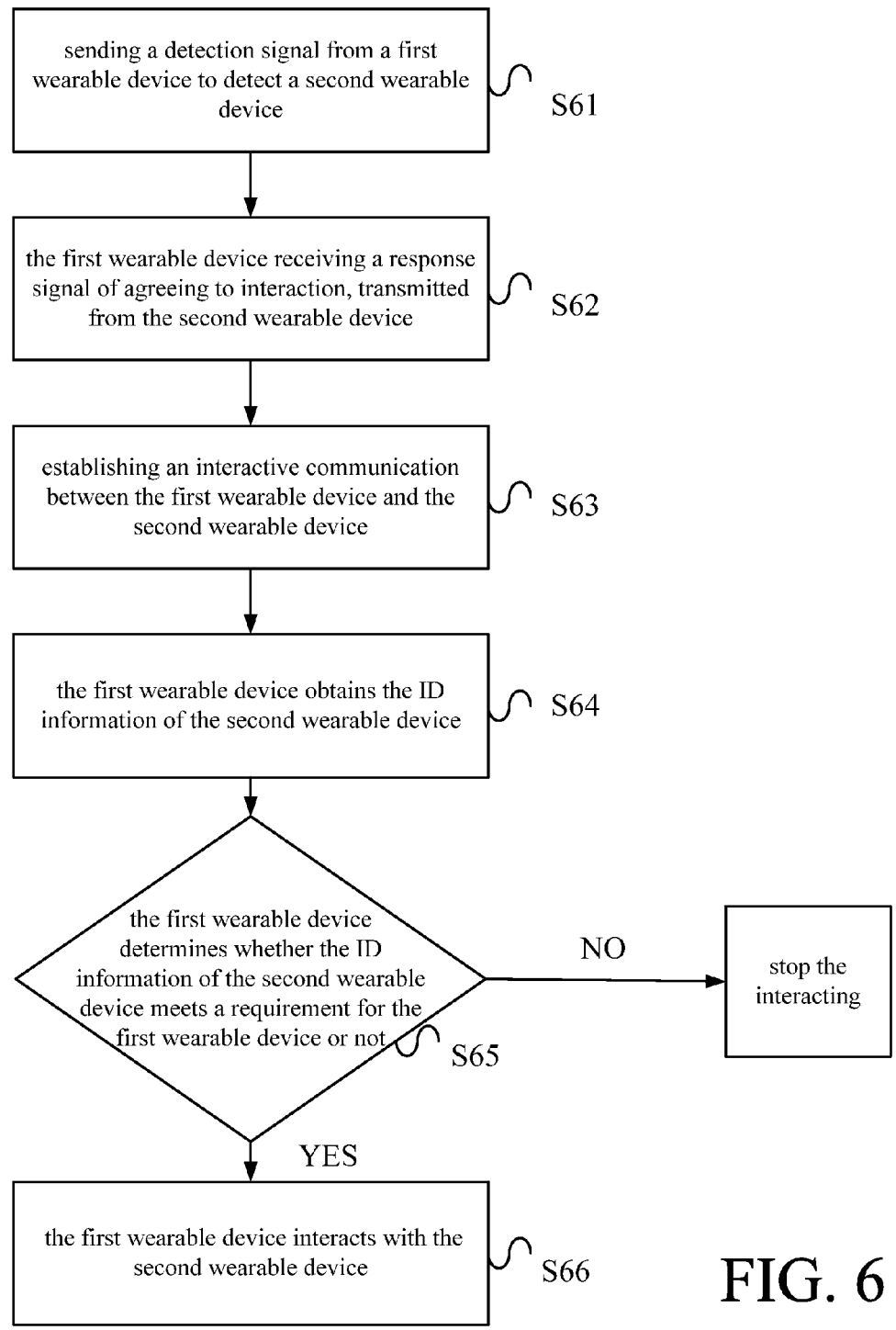
FIG. 6 is a flow chart of the interaction method between the wearable devices in the third embodiment of the invention.

Please refer to FIG. 6. FIG. 6 is a flow chart of the interaction method between the wearable devices in the third embodiment of the invention. The interaction method specifically comprises the following steps of:

Step (S61) to step (S63) are the same as step (S21) to (S23) in the first embodiment. Therefore, the details will not be restated here. For more details, please refer to the statements mentioned in the first embodiment.

(S64) the first wearable device 1 obtains the ID information of the second wearable device 2:

The second wearable device 2 obtains ID verification information of the first wearable device 1 the same way as the first wearable device 1 obtains the ID information of the second wearable device 2.

(S65) the first wearable device 1 determines whether the ID information of the second wearable device 2 meets a requirement for the first wearable device 1 or not:

The requirement for the first wearable device 1 is a requirement predetermined by the first wearable device 1. The first wearable device 1 determines whether or not to interact or continuously interact with the second wearable device 2 according to the requirement.

Upon the first wearable device 1 receiving the ID information of the second wearable device 2, the first wearable device 1 determines whether the ID information of the second wearable device 2 meets a requirement of the first wearable device 1 or not. If the ID information of the second wearable device 2 meets a requirement of the first wearable device 1, step (S66) is performed. If the ID information of the second wearable device 2 does not meet a requirement of the first wearable device 1, the interaction is stopped.

(S66) the first wearable device 1 interacts with the second wearable device 2.

In the interaction method of the third embodiment, the first wearable device 1 can determine whether or not to interact with the second wearable device 2 according to whether the ID information of the second wearable device 2 meets a requirement of the first wearable device, which allows the interaction method to be more friendly and intelligent.

In the interaction method of the first embodiment to the third embodiment mentioned above, the first wearable device 1 interacts with the second wearable device 2 directly. But there is a limit of the hardware and the memory capacity of the wearable device. Therefore, acquiring the meaning of the gesture signal or the ID verification information of the wearable device through the cloud server technology may be slow or cannot be completed. To solve this problem, the present invention further provides an interaction method, which uses a mobile communication terminal to communicate with the wearable device. The details will be illustrated in the fourth embodiment.

Figure 7:
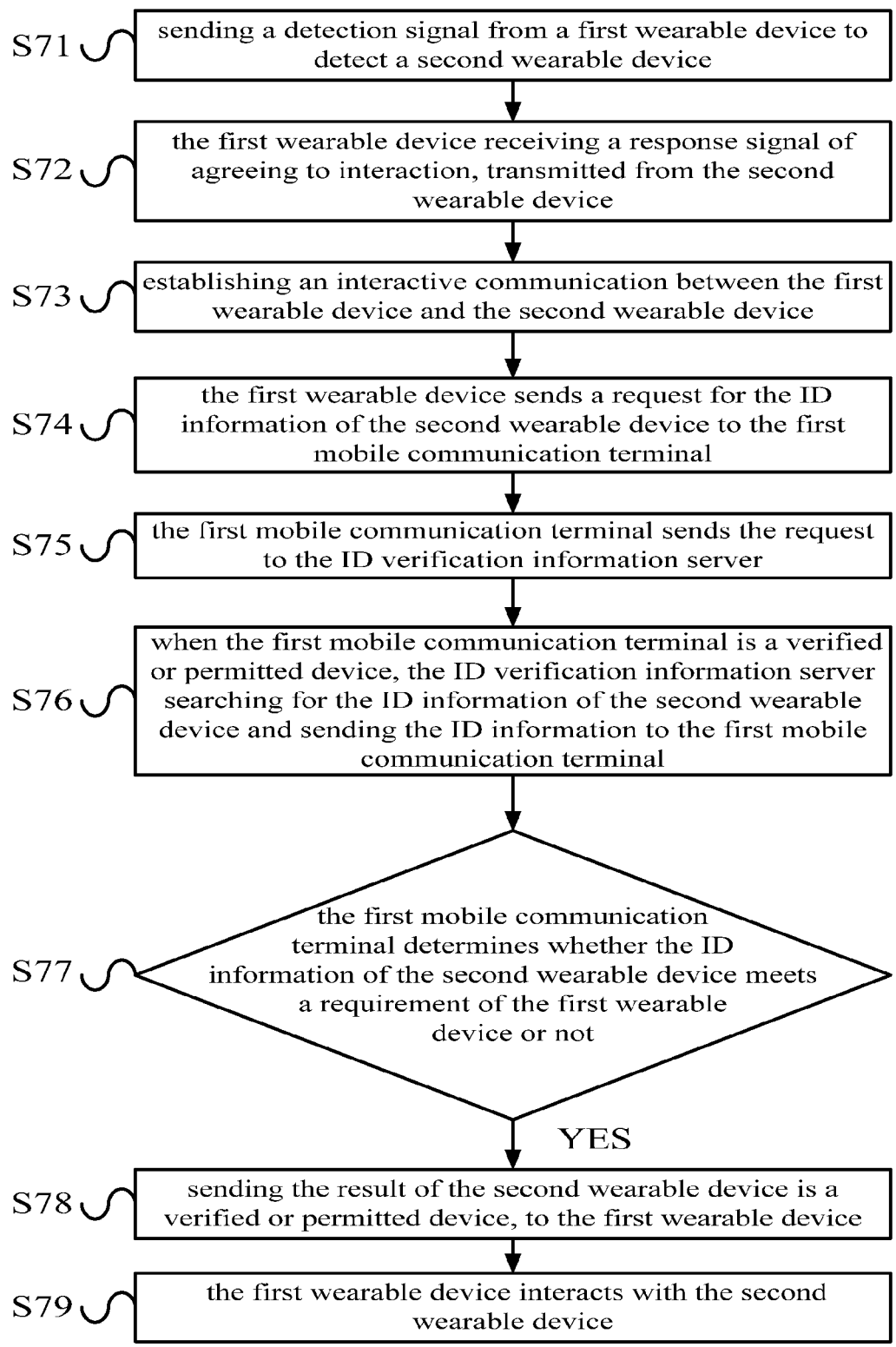
FIG. 7 is a flow chart of the interaction method between the wearable devices in the fourth embodiment of the invention.

The fourth embodiment will use the wearable device sending a request for the ID information of the second wearable device 2 to an ID verification information server through the mobile communication terminal as an example to explain this embodiment. More specifically, please refer to FIG. 7. FIG. 7 is a flow chart of the interaction method between the wearable devices in the fourth embodiment of the invention.

It is worth noting that the first wearable device 1 has to establish an interactive communication with the first mobile communication terminal first. The first mobile communication terminal then establishes an interactive communication with the ID verification information server.

The interaction comprises the following steps of:

Step (S71) to step (S73) are the same as step (S61) to step (S63) in the third embodiment. Therefore, the details will not be restated here. For more details, please refer to the statements mentioned in the third embodiment.

(S74) The first wearable device 1 sends a request for the ID information of the second wearable device 2 to the first mobile communication terminal.

(S75) The first mobile communication terminal sends the request to the ID verification information server.

(S76) When the first mobile communication terminal is a verified or permitted device, the ID verification information server searches for the ID information of the second wearable device 2 and sends the ID information to the first mobile communication terminal.

(S77) the first mobile communication terminal determines whether the ID information of the second wearable device 2 meets a requirement of the first wearable device or not. If the ID information of the second wearable device 2 meets a requirement of the first wearable device, step (S78) is performed.

(S78) sending the result of the second wearable device 2 is a verified or permitted device, to the first wearable device 1.

(S79) the first wearable device 1 interacting with the second wearable device 2.

In the interaction method of the forth embodiment, the first wearable device 1 obtains the ID information of the second wearable device 2 from the ID verification information server through the first mobile communication terminal. The first mobile communication terminal determines whether the second wearable device 2 is a verified or permitted device or not according to the requirement of the first wearable device. Finally, the result of whether the second wearable device 2 is verified or a permitted device is sent to the first wearable device 1. This type of interaction method through the first mobile communication terminal reduces the burden of the first wearable device 1 and allows the interaction to be more successful.

Based on the same method as above, the second wearable device 2 obtains the ID verification information of the first wearable device 1. The wearable device can then send a request to explain the meaning of each said gesture signal to a wearable device gesture collection server or a wearable device gesture signal analyzing server through the cloud server technology or the mobile communication terminal which has established an interactive communication with the wearable device.

Additionally, to reduce the burden of the wearable device, the predetermined interaction rule can be set in the mobile communication terminal. The meaning of the gesture signal generated by the wearable device can then be explained through the mobile communication terminal which has established an interactive communication with the wearable device. More specifically, the wearable device sends the gesture signal to the mobile communication terminal. Upon the mobile communication terminal identifying the gesture signal, the mobile communication terminal then explains the meaning of the gesture signal according to the predetermined interaction rule. Finally, the meaning of the gesture signal is sent back to the wearable device. This type of interaction method can be applied in games of mobile phones. Below is an example of using the smart bracelet to explain the interaction method applied in games of mobile phones.

User A has worn the smart bracelet A and user B has worn the smart bracelet B.

The process of playing games is illustrated as following:

User A generate a gesture and the wearable device A senses and saves the gesture signal from user A. The wearable device A sends the gesture signal from user A to mobile phone A. Mobile phone A then explains the gesture signal of user A to obtain the meaning of the gesture signal according to the predetermined interaction rule set in the mobile phone A. Mobile phone A then shows the meaning of the gesture signal of user A on the screen of the mobile phone. The mobile phone games application program then sends the result of the gesture signal of user A to the mobile phone B of user B. Then, user B performs a corresponding strike back response gesture according to the result of the gesture signal shown on the screen of the mobile phone. The method of dealing with the strike back response gesture is the same as the method of dealing with the gesture generated by user A. The games of the mobile phone can be played repeatedly according to the method mentioned above.

For example, user A and user B playing a table tennis game through the bracelet and mobile phone. The process is shown in the following statement:

Step A, user A stimulates a backhand smash motion using their hand and the bracelet A records the trace and acceleration;

Step B, the bracelet A sends the records of the trace and acceleration of user A to a table tennis game application program of mobile phone A;

Step C, upon the game application program of mobile phone A receiving the records, the screen shows the trace and method of user A and sends the records to user B through Bluetooth or WI-FI;

Step D, upon the game application program of the mobile phone of user B receiving the records of the trace and acceleration of user A, the screen of mobile phone B will show the entrance angle, velocity and target direction of the ball;

Step E, user B performs a corresponding strike back response motion according to the direction and drop point of the ball shown on the screen of the game and so on.

The interaction method between the wearable devices in the first embodiment to the forth embodiment can perform basic interactions between wearable devices, for example, to greet each other. The interaction method can perform higher levels of interaction through the use of cloud server technology.

According to the interaction method between wearable devices in the first embodiment to the forth embodiment, the embodiment of the present invention further provides a wearable device, which can interact with second wearable devices. More specifically, please refer to the fifth embodiment.

Figure 8:
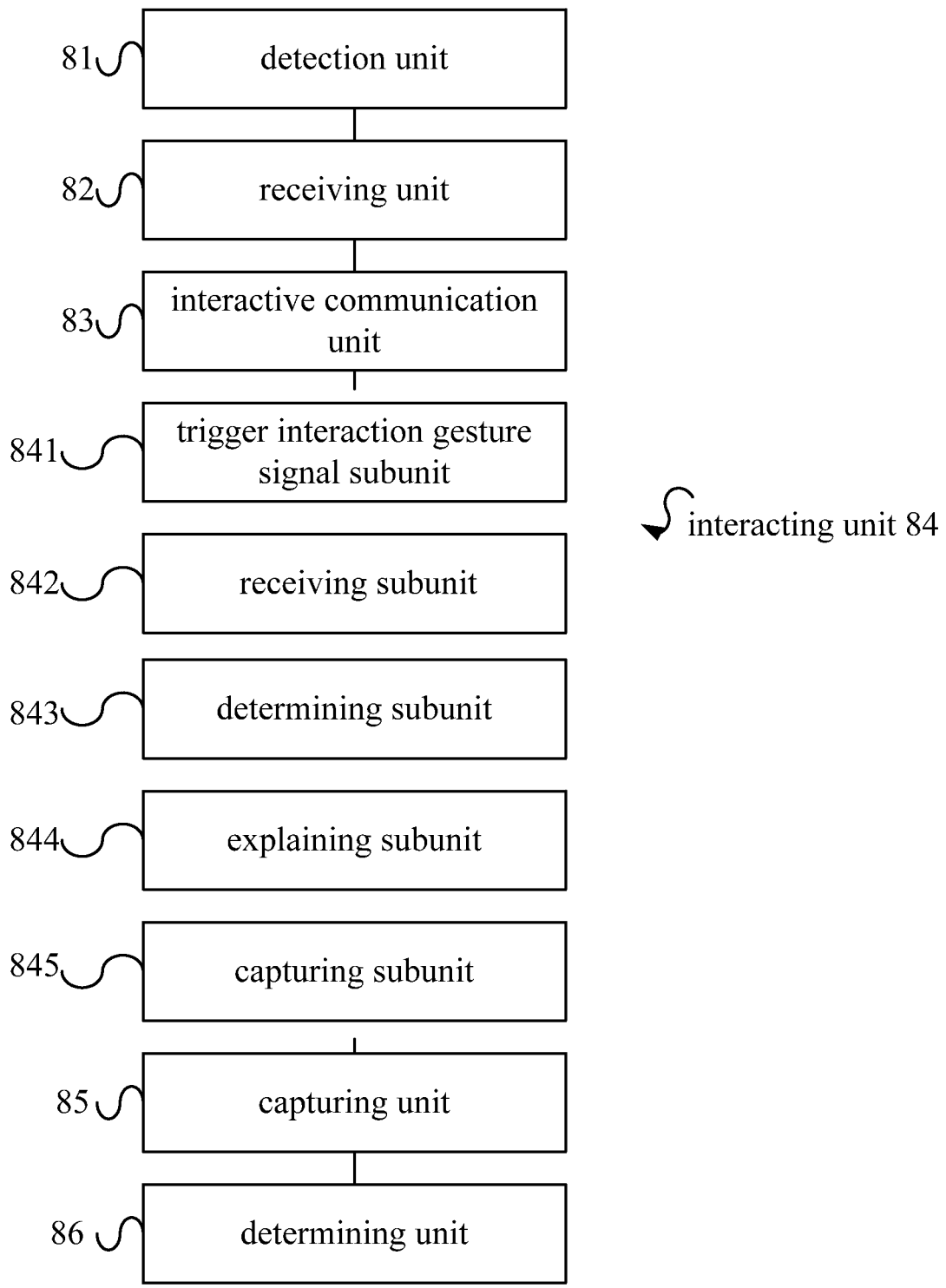
FIG. 8 shows the structure of the wearable device provided by the fifth embodiment of the invention.

Please refer to FIG. 8. FIG. 8 shows the structure of the wearable device provided by the fifth embodiment of the invention, wherein the wearable device comprises:

A detection unit 81, for sending a detection signal to detect other wearable devices (such as the second wearable device) according to a predetermined interaction rule used by the wearable device and the second wearable device;

A receiving unit 82, for receiving a response signal sent from the second wearable device;

An interactive communication unit 83, for establishing an interactive communication with the second wearable device;

An interacting unit 84, for interacting with the second wearable device according to the predetermined interaction rule of the interactive communication.

The interactive communication unit comprised in the wearable device in the fifth embodiment can establish an interactive communication between the wearable device that sent a detection signal and the second wearable device. Therefore, the wearable device can interact with the second wearable device according to the predetermined interaction rule of the interactive communication.

The wearable device mentioned in the fifth embodiment interacts with the second wearable device if the second wearable device agrees to interaction with the wearable device. The wearable device does not know the ID information of the wearable device which it is interacting with. The wearable device also does not know whether the ID information of the wearable device meets a predetermined condition for itself or not. Therefore, the wearable device may run into some problems.

To allow the wearable device to know the ID information of the second wearable device it is interacting with and determine whether the ID information meets a predetermined condition or not, the wearable device mentioned above can further comprise:

A capturing unit 85, for capturing an ID information of the second wearable device;

A determining unit 86, for determining whether the ID information of the second wearable device meets a predetermined condition or not.

The wearable device which comprises the capturing unit 85 and the determining unit 86 can determine whether the ID information of the second wearable device meets a predetermined condition or not. If the ID information of the second wearable device meets a predetermined condition, continue interacting with the second wearable device. If the ID information of the second wearable device does not meet a predetermined condition, stop the interaction. Therefore, the wearable device of the present invention performs basic interaction with a higher intelligence level and a better social ability.

There are many types of predetermined interaction rules used by the wearable device. When the gesture signal is generated by a gesture, the predetermined interaction rule can be used to define the meaning of the gesture signal. At that time, the interacting unit 84 specifically comprises:

A trigger interaction gesture signal subunit 841, for sending an interaction gesture signal to the second wearable device for the interaction gesture signal to be received by the second wearable device;

A receiving subunit 842, for receiving an interaction response gesture signal sent from the second wearable device;

A determining subunit 843, for determining whether the interaction response gesture signal can be identified or not;

An explaining subunit 844, for explaining the definition of the interaction response gesture signal according to the predetermined interaction rule when the interaction response gesture signal can be identified by the determining subunit 843.

When the determining subunit 843 cannot determine whether the interaction response gesture signal can be identified or not, the interacting unit 84 can further comprises a capturing subunit 845, for capturing the meaning of the response gesture signal when the determining subunit 843 cannot identify the response gesture signal.

The wearable device in the fifth embodiment is mainly used to trigger the interaction. The wearable device in the fifth embodiment is an initiator of the interaction. The present invention further provides a wearable device which corresponds to the wearable device mentioned in the fifth embodiment. The wearable device can interact with the wearable device mentioned in the fifth embodiment. The wearable device is mainly used to receive interaction. The wearable device is a receiver of the interaction. More specifically, please refer to the sixth embodiment.

Figure 9:
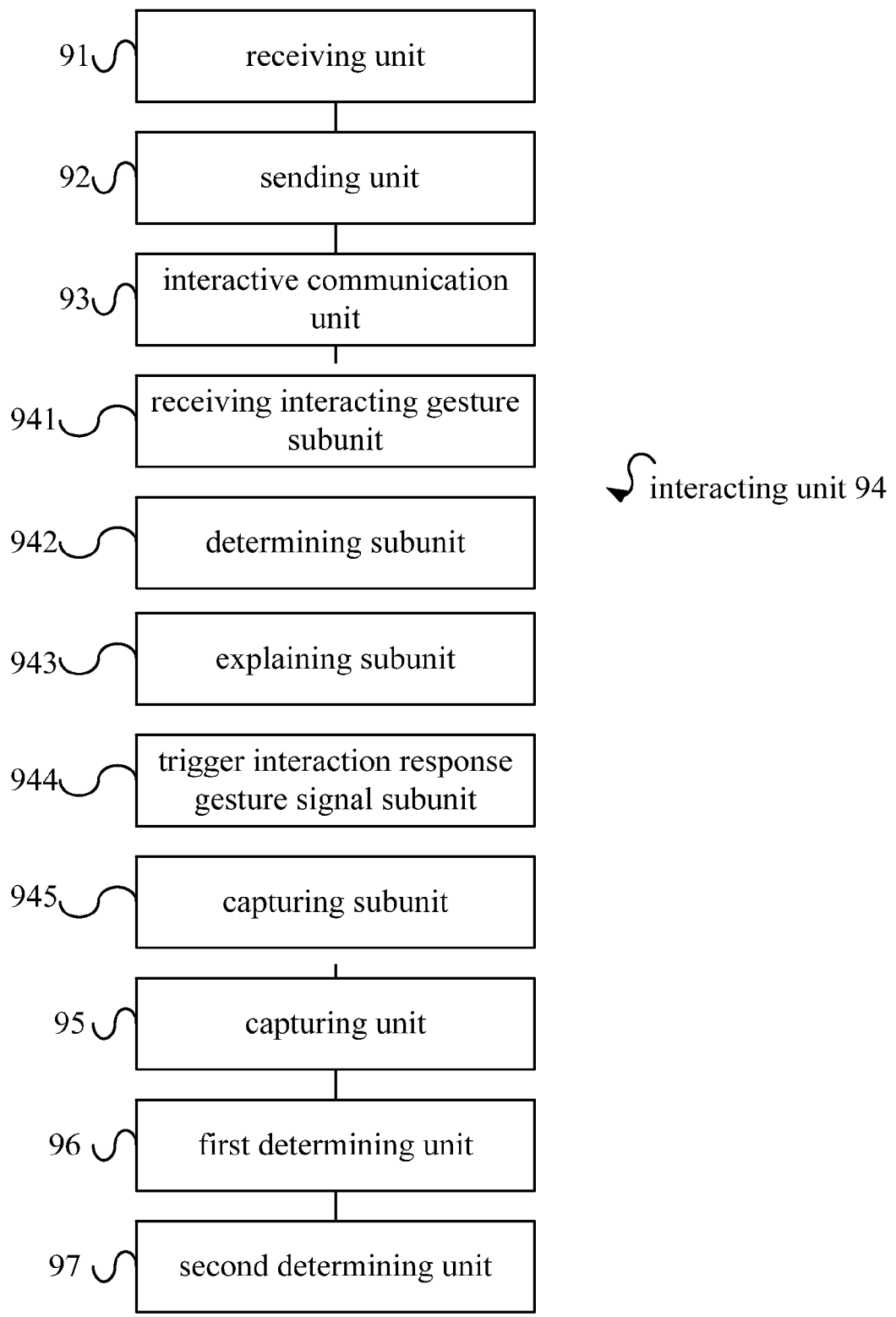
FIG. 9 shows the structure of the wearable device provided by the sixth embodiment of the invention.

Please refer to FIG. 9. FIG. 9 shows the structure of the wearable device provided by the sixth embodiment of the invention. The wearable device comprises:

A receiving unit 91, for receiving a detection signal sent from a first wearable device according to a predetermined interaction rule for use by the first wearable device and the second wearable device;

A sending unit 92, for sending a response signal agreeing to interaction to the first wearable device;

An interactive communication unit 93, for establishing an interactive communication with the first wearable device;

An interacting unit 94, for interacting with the first wearable device according to the predetermined interaction rule by the interactive communication.

The wearable device can receive the detection signal sent from the other wearable device and send a response signal agreeing to interaction. The interactive communication between the two wearable devices can then be established. The interaction between the two wearable devices can be performed according to the predetermined interaction rule, which achieves the interaction function of the wearable device.

Upon the wearable device mentioned in the above embodiment receiving the interacting signal, the interaction is performed without determining whether the information from the other wearable devices meets the predetermined condition or not. Therefore, the wearable device which receives the interacting becomes passive. To enhance the initiative of the wearable device, the wearable device mentioned above can further comprise:

A capturing unit 95, for capturing an ID verification information of the first wearable device sending the detection signal;

A first determining unit 96, for determining whether the ID verification information of the first wearable device sending the detection signal meets a first predetermined condition or not.

The wearable device comprises the capturing unit 95 and the first determining unit 96 which can determine whether the ID verification information of the first wearable device sending the detection signal meets a first predetermined condition or not. When the ID verification information of the first wearable device sending the detection signal meets a first predetermined condition, the wearable device interacts with the first wearable device that sent the detection signal. Therefore, the wearable device which receives the interacting becomes more initiative in the interaction process.

The wearable device can further interact with the wearable device which triggers the interaction first, and then determine whether to continuously interact or not according to the interaction experience. The wearable device can further comprise:

A second determining unit 97, for determining whether the interaction experience meets a second predetermined condition or not. Therefore, the wearable device can determine whether to continuously interact with the wearable device which triggers the interaction or not according to the interaction experience.

In the wearable device, the predetermined interaction rule can be used to define the meaning of the interacting gesture signal. At the time, the interacting unit 94 can specifically comprise:

A receiving interacting gesture subunit 941, for receiving an interaction gesture signal sent from the first wearable device sending the detection signal;

A determining subunit 942, for determining whether the interaction gesture signal can be identified or not;

An explaining subunit 943, for explaining the definition of the interaction gesture signal according to the predetermined interaction rule when the interaction gesture signal can be identified by the determining subunit;

A trigger interaction response gesture signal subunit 944, for sending an interaction response gesture signal according to the definition of the interaction response gesture signal.

The wearable device can interact with other wearable devices through gestures.

When the determining subunit 942 cannot identify the interaction gesture signal, the interacting unit 94 can further comprise:

A capturing subunit 945, for capturing the meaning of the interaction gesture signal when the determining subunit 942 cannot identify the interaction gesture signal.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. An interaction method between wearable devices, comprising:
   sending a detection signal from a first wearable device to detect a second wearable device according to a predetermined interaction rule for use by the first wearable device and the second wearable device;
   upon the second wearable device receiving the detection signal, the second wearable device sending a request to an ID verification information server for an ID verification information of the first wearable device, the ID verification information server searching for the ID verification information of the first wearable device and sending it to the second wearable device if the ID verification information server determines that the second wearable device is a verified or permitted device and the ID verification information of the first wearable device is allowed to be disclosed, the first wearable device receiving a response signal agreeing to interaction, transmitted from the second wearable device according to the predetermined interaction rule if the ID verification information of the first wearable device meets a first condition;
   upon the first wearable device receiving the response signal, establishing an interactive communication between the first wearable device and the second wearable device; and
   the first wearable device interacting with the second wearable device according to the predetermined interaction rule by the interactive communication.

2. The interaction method of claim 1, wherein upon establishing the interactive communication between the first wearable device and the second wearable device, the interaction method further comprises:

stopping the interaction between the first wearable device and the second wearable device, if an interaction between the first wearable device and the second wearable device does not meet a second condition.

3. The interaction method of claim 1, wherein use of the predetermined interaction rule is to define the meaning of a gesture signal, and the step of the first wearable device interacting with the second wearable device comprises:

the first wearable device sending an interaction gesture signal to the second wearable device for the second wearable device to identify and explain the interaction gesture signal according to the predetermined interaction rule;

upon the second wearable device explaining the interaction gesture signal, the first wearable device receiving a response gesture signal from the second wearable device; and the first wearable device identifying, and explaining the response gesture signal according to the predetermined interaction rule, and then sending the interaction gesture signal to the second wearable device or stopping the interaction between the first wearable device and the second wearable device according to the meaning of the response gesture signal.

4. The interaction method of claim 3, wherein if the interaction gesture signal or the response gesture signal cannot be identified or explained, the method further comprises:

the first wearable device or the second wearable device acquiring the meaning of the interaction gesture signal or the response gesture signal which cannot be identified or explained, according to the predetermined interaction rule.

5. The interaction method of claim 4, wherein the step of acquiring the meaning of each of the interaction gesture signals or the response gesture signals which cannot be identified or explained comprises:

a wearable device gesture collection server receiving a request for explaining each said gesture signal, from the first wearable device or the second wearable device;

the wearable device gesture collection server searching for a gesture signal corresponding to said each gesture signal, and sending the corresponding gesture signal to a wearable device gesture signal analyzing server; and the wearable device gesture signal analyzing server analyzing the corresponding gesture signal to obtain the meaning corresponding to said each gesture signal and sending the obtained meaning to the first wearable device or the second wearable device.

6. The interaction method of claim 1, wherein upon establishing the interactive communication between the first wearable device and the second wearable device, the interaction method further comprises:

the first wearable device receiving an ID information of the second wearable device, wherein the step of the first wearable device interacting with the second wearable device is performed if the ID information of the second wearable device meets a requirement of the first wearable device.

* * * * *